(12) United States Patent
Pearce (10) Patent No.: US 12,060,776 B2
(45) Date of Patent: Aug. 13, 2024

(54) DOWNHOLE JOINT ROTATOR

(71) Applicant: CONOCOPHILLIPS COMPANY, Houston, TX (US)

(72) Inventor: Christopher A. Pearce, Houston, TX (US)

(73) Assignee: CONOCOPHILLIPS COMPANY, Houston, TX (US)

( * ) Notice: Subject to any disclaimer, the term of this patent is extended or adjusted under 35 U.S.C. 154(b) by 0 days.

(21) Appl. No.: 18/052,016

(22) Filed: Nov. 2, 2022

(65) Prior Publication Data
US 2023/0167712 A1 Jun. 1, 2023

Related U.S. Application Data

(60) Provisional application No. 63/274,991, filed on Nov. 3, 2021.

(51) Int. Cl.
| | |
|---|---|
| *E21B 41/00* | (2006.01) |
| *E21B 17/00* | (2006.01) |
| *E21B 17/05* | (2006.01) |
| *E21B 17/10* | (2006.01) |
| *E21B 43/12* | (2006.01) |
| *H02K 5/132* | (2006.01) |

(Continued)

(52) U.S. Cl.
CPC ............ *E21B 41/00* (2013.01); *E21B 17/003* (2013.01); *E21B 17/05* (2013.01); *E21B 17/1078* (2013.01); *E21B 43/126* (2013.01); *E21B 43/127* (2013.01); *H02K 5/132* (2013.01); *H02K 11/24* (2016.01); *H02K 11/25* (2016.01); *H02K 17/165* (2013.01); *E21B 47/07* (2020.05)

(58) Field of Classification Search
CPC ........ E21B 41/00; E21B 17/003; E21B 17/05; E21B 17/1078; E21B 23/01; E21B 43/126; E21B 47/07; E21B 43/127; H02K 5/132; H02K 11/24; H02K 11/25; H02K 17/165

See application file for complete search history.

(56) References Cited

U.S. PATENT DOCUMENTS

| | | | |
|---|---|---|---|
| 4,744,416 A | * | 5/1988 | Bower ................ E21B 47/107 166/253.1 |
| 5,327,975 A | | 7/1994 | Land |

(Continued)

OTHER PUBLICATIONS

McCaslin, K. P. "A study of the methods for preventing rod-wear tubing leaks in sucker-rod pumping wells." SPE Production Eng 3 (4), 615-618 (1988) Paper No. SPE-16198-PA.

(Continued)

*Primary Examiner* — Brad Harcourt
(74) *Attorney, Agent, or Firm* — Boulware & Valoir PLLC (57) ABSTRACT

A downhole tubing rotator that has a housing configured into a production tubing string in a well in a reservoir, the housing being generally cylindrical with a hollow center and containing a two pole, three phase induction squirrel cage motor operatively connected to a tubing rotator configured to clamp onto a production tubing joint and rotate one or more production tubing joints (but not an entire production tubing string) when the motor is activated. An armor-protected insulated power and control cable connects the motor to a control box positioned at a surface of a reservoir and various sensors provide feedback for the unit. Methods of using this tool are also provided.

15 Claims, 3 Drawing Sheets

(51) Int. Cl.
*H02K 11/24* (2016.01)
*H02K 11/25* (2016.01)
*H02K 17/16* (2006.01)
*E21B 47/07* (2012.01)

(56) References Cited

U.S. PATENT DOCUMENTS

| | | |
|---|---|---|
| 5,339,913 A | 8/1994 | Rives |
| 5,427,178 A | 6/1995 | Bland |
| 5,431,230 A | 7/1995 | Land |
| 5,566,769 A | 10/1996 | Stuart |
| 6,026,898 A | 2/2000 | Bland et al. |
| 6,199,630 B1 | 3/2001 | Blundell et al. |
| 6,543,533 B2 | 4/2003 | Meek et al. |
| 6,834,717 B2 | 12/2004 | Bland |
| 7,306,031 B2 | 12/2007 | Wright et al. |
| 8,272,434 B2 | 9/2012 | Garcia |
| 9,366,104 B2 | 6/2016 | Obrejanu |
| 9,657,535 B2 | 5/2017 | Breit et al. |
| 11,401,767 B2 | 8/2022 | Wright et al. |
| 2014/0124219 A1 | 5/2014 | Dirksen et al. |
| 2014/0262342 A1* | 9/2014 | Obrejanu ............ E21B 43/126 166/117.7 |
| 2017/0045055 A1* | 2/2017 | Hoefel ................. H02K 5/132 |
| 2017/0264179 A1 | 9/2017 | Khotsyanov et al. |
| 2020/0158116 A1* | 5/2020 | Esberger ............ F04D 15/0066 |
| 2021/0262296 A1* | 8/2021 | Al-Mousa ............ E21B 47/12 |

OTHER PUBLICATIONS

NOV Wellbore Technologies Turboscope Product Brochure, released 2015. (p. 15).

\* cited by examiner

DOWNHOLE JOINT ROTATOR

PRIOR RELATED APPLICATIONS

This application claims priority to U.S. Ser. No. 63/274,991, filed Nov. 3, 2021 and incorporated by reference in its entirety for all purposes.

FEDERALLY SPONSORED RESEARCH STATEMENT

Not applicable.

FIELD OF THE DISCLOSURE

The disclosure generally relates to tools for use in maintaining oil wells, in particular to tubing or joint rotators.

BACKGROUND OF THE DISCLOSURE

Artificial lift is required on the majority of all oil wells and on some gas wells and the most common form of artificial lift is the beam pump sucker rod system. The beam pump is mechanically simple, cost effective, and has a long service life. However, eventually there will be tubing failures that necessitate replacing tubulars, resulting in increased down time and lost production, negatively impacting the economics of oil production.

The most common tubing failure is split tubing caused by rod wear. The rods and rod boxes wear through the tubing in a narrow groove comprising about 20% of the inside diameter of the tubing. Mechanical wear from the up and down movement of the rods and hydrostatic pressure inside the tubing causes the tubing to fail, requiring the well be taken offline and the tubing replaced.

Tubing wear is usually mitigated by tube rotator. Rotating the tubing string continually during pumping operations distributes any rod wear over the entire inside diameter and can extend tubing life by 6 to 10-fold, resulting in reduced operating costs and less downtime for maintenance.

All commercial tube rotators are surface units, however, wherein the tubing string is hung from the unit, such that the rotator rotates the entire tubing string. Typically, the tubing rotator rotates the tubing at surface with a swivel located in the tubing string downhole that allows this rotation.

While a very useful tool, the surface tubing rotator does have disadvantages, particularly in a deviated well. Due to the deviations in the well between surface and the swivel, torque can be trapped in the tubing and released suddenly once enough torque overcomes the frictional forces. When this torque is suddenly unloaded, the tubing whips around violently and causes the tubing collars to gouge the well casing. This type of wear was recently identified in a casing caliper log of a well that had a tubing rotator installed for about 1 year.

U.S. Pat. No. 9,366,104 describes a tubing rotator that is not surface based, and instead is a downhole tubing rotator. In this patent, a mandrel harnesses torque from a progressive cavity pump (PCP) stator to which it is coupled. Operation of the pump rotor induces a torque on the pump stator, and that torque is harnessed by the mandrel. A rate of rotation of the mandrel due to the torque from the pump stator is controlled, and the rotation rate is hydraulically reduced in one embodiment. However, this system requires a PCP pump, which is not in universal use downhole. Plus, the system puts wear and tear on the pump, so trades one problem for another. In addition, this downhole tool still rotates the entire string, thus any torque trapping caused by well deviations produce the same result as a surface mounted tubing rotator.

Thus, what is needed in the art are better devices for rotating tubing in a well. The ideal device would rotate only those portions of the well tubing that are in contact with the sucker rod, leaving the rest of the tubing as is.

SUMMARY OF THE DISCLOSURE

Holes in tubing are the number one driver for well interventions in rod pumped wells. To extend the mean time between failures ("MTBF") for high frequency failure wells, a traditional tubing rotator was employed and successfully improved MTBF. A byproduct of this device, however, was casing wear. This casing wear is not acceptable because it reduces well life.

The traditional tubing rotator rotates the tubing at surface with a swivel located in the tubing string downhole. Due to the deviations in the well between surface and the swivel, torque can be trapped in the tubing, and released suddenly once enough torque is trapped in the string to overcome any frictional forces. When this torque is unloaded, the tubing whips around violently and causes the tubing collars to gouge the inner surface of the casing, creating even worse problems that the sucker rod wear.

This invention seeks to focus the tubing rotation to an area of concern in a well and obviate the need to rotate the entirety of the tubing string (above the swivel) and thereby prevent the harmful effects or trapped torque being released and causing damage to the casing.

The invention solves the problem by allowing the tubing to be rotated between 2 points downhole. In other words, one or more joints are rotated, but not the entire string.

Rotation between 2 points downhole will reduce and/or eliminate the ability for torque to be trapped in the tubing string because the installation can be designed around any well bore deviations.

The downhole joint rotator or "DJR" will be installed downhole and powered/controlled with electric current that is passed through a control line, similar to how an electronic submersible pump (ESP) operates. This control line will control how fast the joints are rotated, as well as its direction if needed, and will also be able to relay downhole information back to surface. The rotation can be continuous, e.g., a few degrees per day, or power can be supplied intermittently, e.g., once a day, every other day, weekly and the like. Preferably, however, the motor runs more or less continuously, rotating tubing very gradually.

The exact arrangement of components of the downhole tube can vary, as the tool may rotate tubing above the tool or below the tool, which would change or reverse the orientation of the components. If rotating tubing below the tool, there is typically a swivel in the string below, unless sufficiently close to the bottom as to not be needed. The tubing above region to be rotated will also contain a swivel, although is preferably a part of the tool itself. These principles are reversed if the tool sits below the rotated region, the tubing having a swivel at a top end of a region to be rotated (unless close enough to the top to be avoided), and a swivel below or as part of the tool. As yet another alternative, the string can be fitted with more than one tool, and the swivels in the tool bracket the tubing region to be rotated.

The housing can be in two parts, upper and lower that can move independently of each other, such that the motor rotates the upper part, thereby rotating the tubing attached thereto. However, it is also possible that the motor directly rotates the tubing connected thereto. It is expected however, that an upper housing component will be ratcheted slowly in the direction of rotation, and the tubing connected thereto will also rotate.

If instead, the tool is designed to rotate tubing below the tool, the motor will rotate the lower part. As above, it is possible that the motor directly rotates the tubing connected thereto. It is expected however, that a lower housing component will be ratcheted slowly in the direction of rotation, and the tubing connected thereto will also rotate.

A rotator module grabs the tubing, usually at a collar, and thus transfers force from the motor to the tubing. This may also be a component of the motor or adjacent thereto.

An anchoring module may be added to the tool, or be integral therewith, for gripping the casing and anchoring the tool and the placement of this component can vary, providing only that it does not interfere with the rotation of the tubulars. Preferably, the anchoring module is interchangeable, thus providing a series of anchoring modules as needed for different size casings and merely fits over an exterior housing on the tool. Alternatively, if the anchoring module has expandable arms that extend to contact the casing, a single module may fit in a wide range of casings. It may also be a fixed component of the tool in this instance, although of course capable of disassembly for repairs or replacement.

Any means of imparting a rotating force can be used, such as hollow bore motors, the main requirement for the motor is that it is of sufficiently small profile as to fit into the casing of a well. It is expected that a motor will need to be specifically designed for this purpose, and that increased length will be used to compensate for reduced diameter and still provide sufficient torque to rotate the string or a portion thereof.

There are many ESP pump designs that could be suitably modified for use herein, many designs having a motor that circumnavigates tubing or a central passageway (e.g., a squirrel cage motor), as would be needed here. The modified ESP motor only needs the clamp or rotator to grab and apply torque to the tubing and obviously fluid handling components of an ESP are not needed in the DJR tool. The modified ESP motor may also be provided the ability to change directions when used with threaded tubing in certain embodiments, but this is optional. A device that can change directions may be able to avoid the use of swivels. Fortunately, many of the ESPs are built in modules, facilitating the modification as needed herein. A simplified schematic of such a design in shown in FIG. 1.

Advantages include rotating a specific interval of the tubing, rather than the entire length of the string of tubing, thus obviating any torque trapping at deviated sections of well. In addition, there is the potential ability to send downhole data to the surface through the control line, the ability to monitor the operation of the rotating device through the control line, and potentially more. Thus, the ideal tool would be equipped with sensors, such as a torque sensor, pressure and temperature sensors, motor temperature sensors, vibration sensors, and the like.

Because of the downhole joint rotator's unique application requirement in deep, relatively small-bore casings, we expect to maximize the power output of the motor as a function of the diameter (limited by tubing and casing diameters) and length (less limited) of the unit. Therefore, the equipment is typically long and slender. The components are manufactured in varying lengths up to approximately 30 ft, and for certain applications, the components, such as the motor and/or rotator can be multiple components connected in series. Alternatively, the tools themselves can be used in series and if a swivel included therein, no swivels would be needed in the tubing. In some applications, a single tool may suffice to rotate a small portion of string, and a second or more tool added when string length and/or deviations mean that additional power is required to rotate the string.

The surface controller provides power to the motor and protects the downhole electric and mechanical components. There are three types of motor controllers used on ESP applications and all are generally specifically designed for application with ESPs, but can be modified for use herein. They typically include the switchboard, soft starter, and the variable speed controller. Normally, all utilize solid state circuitry to provide protection, as well as a means of control for the motor system.

The controller usually includes a disconnect switch. The manual disconnect switch allows for the primary power to be shut off from the outside of the unit. It is also fused to provide circuit protection in case of power surges.

The controller may also comprise a control power transformer or "CPT". The CPT generally has multiple taps for selection of a range of output voltages. This allows a switchboard to be used within its rated range for different voltage- and amperage-rated motors.

The recording ammeter (or ampere meter) historically has been a pen-type chart recorder that plots one leg of the three-phase current, but currently digital monitoring systems are used to monitor all three-phase currents. These also have capability to store the monitored data in memory and display these data in graphical format.

The control module is preferably a solid-state device that offers basic functions necessary to monitor and operate the DJR in a reliable manner. The unit examines the inputs from the CPT and other input signals and compares them with preprogrammed parameters entered by the operator. Some of the functions include overload and time-delayed underload protection, restart time delay, and protection for voltage or current imbalance. Additional external devices can be connected, which provide for e.g., downhole motor temperature protection, and the like.

The starter is preferably a soft-start controller. The soft starter is designed to reduce the high electrical and mechanical stresses that are associated with starting DJR systems. The soft starter is designed to drop the voltage to the motor during the initial startup phase. The drop-in voltage reduces the inrush current, thus "softening" the starting characteristic. These devices use either primary reactors or solid-state devices to control the amount of power delivered to the motor as it is coming up to speed. A soft starter typically extends the time for the motor to reach full speed from 0.200 seconds of across the line switchboard to 0.500 seconds.

After this startup period, the soft-start system switches off and the controller becomes a normal switchboard. In addition, most application software programs will evaluate the downhole system for electrical and mechanical stresses and will advise as to whether a soft start is recommended. If a system is too soft, a motor could be damaged because of cogging or failure to reach starting speed.

A variable speed controller or "VSC", also referred to as a variable speed drive, may be used with the DJR tool and provide variable speed. Benefits include a broadened application range of the DJR, optimal efficiency of the downhole system, electrical isolation of the downhole equipment from surface power disturbances, and reduced starting stresses. Disadvantages include higher initial-capital cost, increased design complexity, interface with the electrical utility, additional motor heating, potential increase in voltage stresses, and possibly higher electricity cost.

Because the DJR operates in a hostile and confined environment, monitoring how it operates may be difficult. The DJR's reliability or run life is directly related to the continual monitoring of its operating parameters and the wellbore conditions, but it may be difficult to find sensors and electronics that operate reliably and long term under the range of downhole conditions required. Not only is this information important to the run-life, but it is also important for the evaluation of the design of the DJR system. This evaluation can provide guidance on possible operational changes that can be made to optimize the current system or the DJR design changes needed to optimize the application. If DJR tool were fully instrumented and continuous monitoring systems employed, run life and operational performance would be improved significantly, but, of course the wellbore economics has to support these extra efforts. We anticipate that a fully sensor-equipped unit will be used in testing, and the tool possibly simplified for commercial uses.

Sensors are available for mounting internally in the DJR components or externally as an attachment to the system. The signals from these sensors are communicated to the surface readout module by a separate instrument wire, "I"-wire, or by a signal imposed on one leg of the DJR power and control cable.

Typically, the standard DJR application will provide the opportunity to monitor surface parameters, such as three-phase amps and volts and internal motor temperature. This measurement may be important not only to the protection of the motor but also in selecting the correct motor HP rating and lubricating oil for the application. If a loaded motor is running close to its maximum temperature rating, operational steps could be implemented to reduce its load and temperature. Also, the next unit in the hole could be derated or sized with a larger motor to run underloaded. Likewise, if the motor is running cool, there are future opportunities to install a smaller motor. Additionally, sudden temperature spikes or long-term gradual changes are an indication of changing equipment performance or wellbore conditions, which may need evaluation.

Another parameter that may be monitored is equipment vibration. There have been several applications that have used downhole vibration sensors. Unless there is a sudden step change in the measurement, this parameter is difficult to evaluate. There is a possibility however, that with more case histories, vibration monitoring can become a useful evaluation tool.

The invention also includes novel methods of rotating joints in a well, where only a specified interval of tubing downhole is rotated from a motor/driver installed downhole and powered through a control line. In the method, the tool is sent downhole and anchored to the casing as needed, depending on design, and the controller used to initiate a soft start and thereby rotate on or more joints downhole. Where only a short interval over a deviation is to be rotated, swivel joints are placed above or below the deviation, and the tool below the top swivel or above the bottom swivel or at some distance therebetween. Alternatively, two tools may bracket the region to be rotated. This is particularly useful in bracketing deviations in the well casing.

For an embodiment that has two motors, the housing may have two movable parts such that the motor applies rotation both above and below the tool. In this case, our experiments may show that the tool is better placed at the ⅓, ½, or ⅔ position in the portion of string to be rotated. Various sensors will provide data to the surface, and activity modified as needed. For instance, if the motor temperature increases to a safety point, the motor may be halted for a period of time or at least slowed.

The invention includes any one or more of the following embodiments in any combination(s) thereof:

A downhole joint rotator tool, said tool comprising:
a) a housing configured to fit into a production tubing string in a well in a reservoir;
b) said housing being generally cylindrical with a hollow center;
c) said housing having a tool joint at an upper end thereof to connect to a joint above said tool and a separate or an integral swivel joint at a lower end for a rotating connection to a joint below said tool;
d) said housing comprising an induction motor with a hollow center configured to rotate a joint below said tool;
e) an armor-protected insulated power and control cable connecting said induction motor to a control box positioned at a surface of a reservoir;
f) wherein said tool is able to rotate joints below said tool, but not above said tool, when said induction motor is activated via said control box.

Obviously, if the tool is inserted into tubing in the opposite orientation, everything will be reversed, but orientation terms (up, down, above, below) as used herein assume that the tool is placed so as to rotate tubing below the tool. It does not imply an orientation in the hole during actual usage, however.

A downhole joint rotator tool, said tool comprising:
a. a cylindrical housing with a hollow center configured to fit into a production tubing string in a well in a reservoir;
b. either said production tubing string or said tool comprising at least one swivel joint;
c. said housing comprising an induction motor with a hollow center configured to rotate at least one joint above or below said tool;
d. an armor-protected insulated power and control cable connecting said induction motor to a control box positioned at a surface of a reservoir;
e. wherein said tool is able to rotate one or more joints above or below said tool but not an entirety of said production tubing string when said induction motor is activated via said control box.

Any tool herein described, further comprising an anchor module to anchor the tool to a casing in said well and/or a centralizer. Alternatively, the anchor module may provide the centralizing function.

Any tool herein described, said motor being a two pole, three phase induction squirrel cage motor, although any hollow shaft motor may be used.

Any tool herein described, further comprising one or more sensors operatively connected to said tool and said cable, such as one or more of a torque sensors operatively connected to said tubing rotator; a temperature sensor and/or a pressure sensor operatively coupled to the rotator, motor, or housing; a motor temperature sensor operatively coupled to the motor; a vibration sensor operatively coupled to said housing, rotator or motor.

Any tool herein described, further comprising a plurality of two pole, three phase induction squirrel cage motors each operatively connected to a tubing rotator.

Any tool herein described, wherein the swivel is a part of the tool or is an independent element positioned above or below the tool. Usually there will be two swivel joints bracketing the area to be rotated, and these can be part of the tool if two tools are used, or they can be in the tubing, or combinations thereof, e.g., one in the tool and one in the tubing.

A method of rotating one or more production tubing joints in a production tubing string, said method comprising:
a) deploying a production tubing string inside a casing in a well in a reservoir, said string comprising a plurality of tubing joints below any tool as herein described;
b) said production tubing string or said tool comprising one or more swivel joints bracketing a section of tubing to be rotated;
c) applying power to said tool such that one or more tubing joints in said section to be rotated is rotated from an initial position, but not an entirety of said production tubing string; and
d) producing hydrocarbon from said production tubing.

Any method herein described, wherein said rotation is <10° per day or about <5° per day or about <2° per day. Alternatively, the rotation may be intermittent at daily, or twice daily or every other day or weekly, etc. as needed to address wear. As used herein, "power and control cable" typically includes a multiplicity of lines, for conveying power to the motor, any additional control signals that may be needed, and for conveying sensor data to the surface.

As used herein "production tubing" is run into the drilled well after the casing is run and cemented in place. Production tubing protects wellbore casing from wear, tear, corrosion, and deposition of by-products, such as sand/silt, paraffins, and asphaltenes. Along with other components that constitute the "production string," it provides a continuous bore from the production zone to the wellhead through which oil and gas can be produced. It is usually between five and ten centimeters in diameter and is held inside the casing through the use of expandable packing devices. Purpose and design of production tubing is to enable quick, efficient, and safe installation, removal and re-installation.

As used herein, a "joint" is a single section of tubing, typically having threaded ends or some other coupling means and being about 30-40 feet long. Joint, tubular, tubing or pipe may be used interchangeably herein.

"Tools joints" are the thickest and the strongest part of the tubulars. They can be defined as pin-box connections with rounded threads and they are manufactured separately from the pipe body, and welded onto the upset area. There are different types of tool joints such as internal flush (IF), full hole (FH) and slim hole (SH). Tubing does not always use tool joints for connections. Most production tubing joints are Externally Upset End Threaded and Coupled (EUE T&C).

A "thread" is a helical or spiral ridge on a pipe, screw, nut, or bolt. Being "threaded" herein refers to spiral grooves on an inner surface of one device that is able to mate with a threaded exterior surface of another device. Most tool joints are threaded.

A "swivel" or "swivel joint" or "swivel coupler" is a device that holds two joints together but allows one or both joints to rotate independently. See e.g., the Downhole Swivel Joint by Rubicon Oilfield International or Smith International, Inc., the Downhole Tubing Swivel by Pinnacle Oil Tools, or the Swivel Joints by Telaris, to name a few.

As used herein, "casing" is a large diameter pipe that is assembled and inserted into a recently drilled section of a borehole. Similar to the bones of a spine protecting the spinal cord, casing is set inside the drilled borehole to protect and support the well. The lower portion (and sometimes the entirety) is typically held in place with cement. Deeper strings usually are not cemented all the way to the surface, so the weight of the pipe must be partially supported by a casing hanger in the wellhead.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim. The phrase "consisting of" is closed, and excludes all additional elements. The phrase "consisting essentially of" excludes additional material elements, but allows the inclusions of non-material elements that do not substantially change the nature of the invention, such as instructions for use, replacement parts, and the like. Any claim or claim element introduced with the open transition term "comprising," may also be narrowed to use the phrases "consisting essentially of" or "consisting of," or vice versa. However, the entirety of claim language is not repeated verbatim in the interest of brevity herein.

The following abbreviations are used herein:

| ABBREVIATION | TERM |
|---|---|
| ESP | Electronic submersible pump |
| PCP | Progressive Cavity Pump |
| DJR | Downhole Joint Rotator-an acronym for the tool of the invention |
| CPT | Control Power Transformer |
| VSC | Variable Speed Controller |
| MTBF | Mean Time Between Failures |
| HP | High Pressure |
| OD | Outer Diameter |
| IF | Internal Flush |
| FH | Full Hole |
| SH | Slim Hole |
| EUET&C | Externally Upset End Threaded & Coupled |

DETAILED DESCRIPTION

Figure 1:
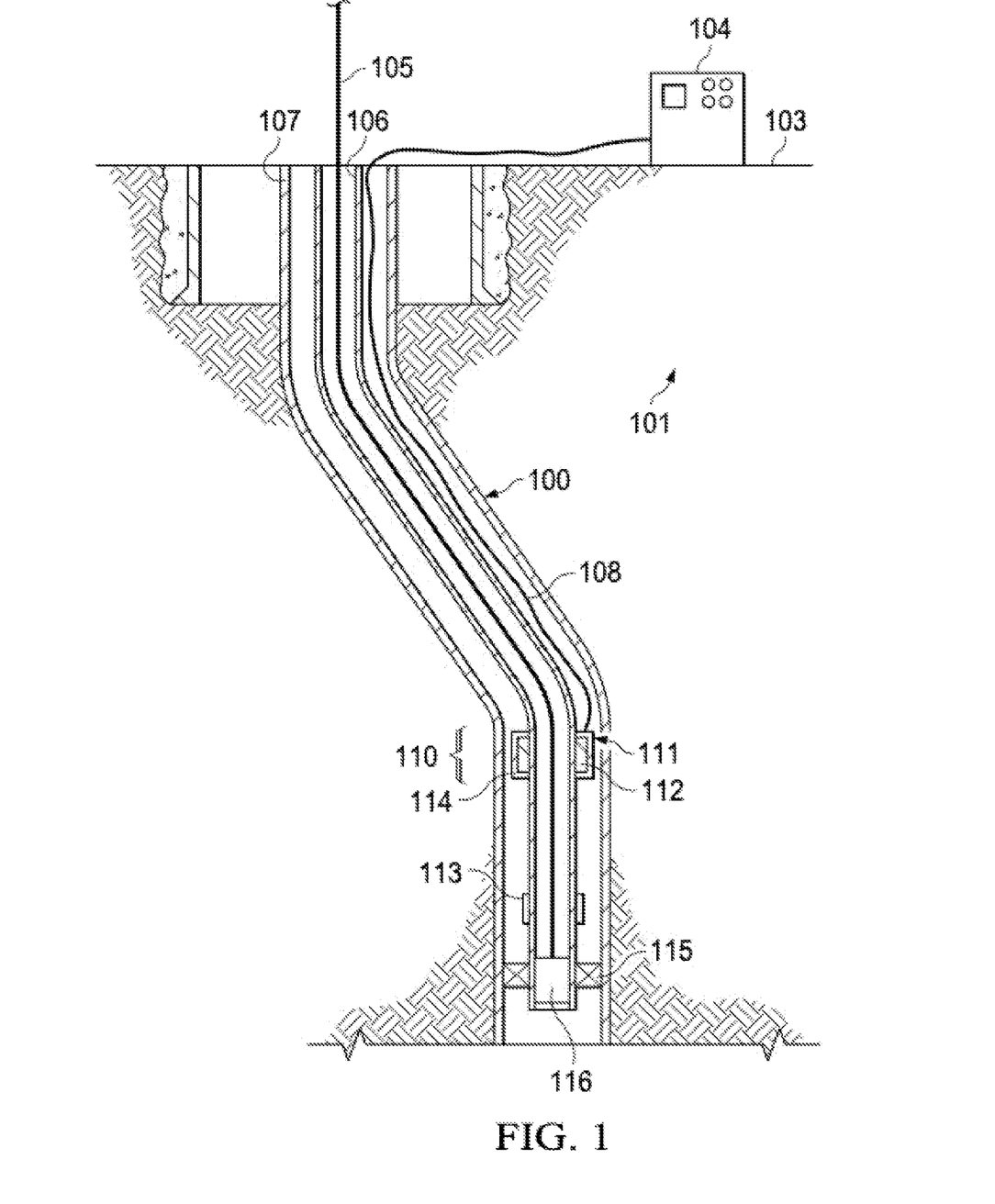
FIG. 1. Schematic of the system deployed downhole.

FIG. 1 shows the well 100 in a reservoir 101 (not drawn to scale). A control panel 104 at the surface 103 is connected via control line 108 to the downhole rotator tool 110. Tool 110 fits into the tubing string 106 and is small enough in outer diameter (OD) to fit inside the production casing 107. The tool 110 comprises a generally cylindrical housing 114 with hollow center that contains tubing rotator 111 driven by motor 112 (here shown as a simple black box for both components). Shown here is a swivel 113 at a lower end of the tubing string, which allows the tool to rotate just the portion above the swivel. A second swivel joint may be located above the tool and below the well deviation or can be in a second tool. Also shown here is pump 116, packer 115 and rod string 105 which provide the artificial lift system.

The tool can be anchored to the casing or just have some sort of contact with the casing to account for the reactive torque from rotating the tubing. For example, the tool can have either drag blocks that are incorporated into the tool or arms or fins that are electrically deployed to the casing when the rotator is activated. The tool will be made up into the tubing string just as any other tubing string component would be, i.e. packers, subs, nipples, etc. and thus connected thereto via two tool joints or a tool joint and swivel joint.

Figure 2:
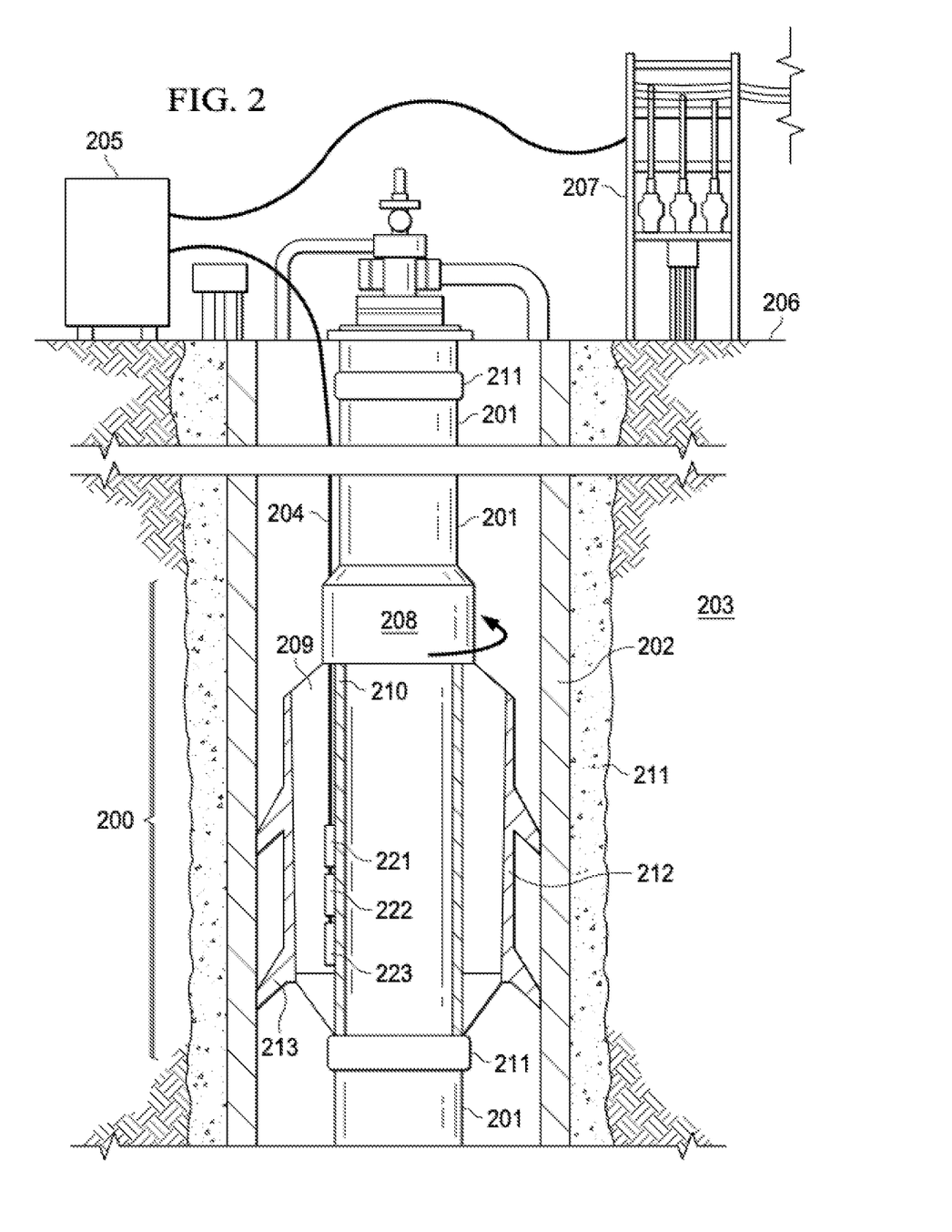
FIG. 2. Downhole joint rotator tool.

The DJR tool is shown in more detail in FIG. 2. DJR tool 200 fits into the tubing 201 inside casing 202 in reservoir 203, typically via standard tool joint fittings (usually threaded ends), not shown herein. The casing 202 is cemented 211 as is typical, but this is not an essential feature. Power and control cable 204 connects to pump control box 205 at surface 206 powered by electric supply 207. Cable 204 can be round, unless space needs may dictate a flat cable. In addition, the cable is armor protected and insulated.

Tool 200 has a rotator portion 208 that grips the tubing to rotate it driven by motor 209 which is protected from downhole fluids by the motor protector 210. The submersible motor is preferably a two pole, three phase induction motor, but any suitable motor could be used.

Swivel 211 at the bottom end of the string allows the joints above it to rotate freely. See also swivel 211 at top above several joints. The bottom-most swivel 211 may be part of tool 200 or separate therefrom, as preferred. If part of the tool, it may be exchangeable with a series of swivels whose top end each fits the tool, but having different lower end diameters, each designed to fit on a different size tubing.

The rotator portion 208 may also come in series, the lower end of each configured to fit the motor and the upper end to fit different size tubing. Alternatively, and preferably, an adaptor portion (not shown) may be provided to accommodate different size tubing. The adaptor lower end would thus always be the same size in order to couple to the rotator 208 and the upper end would have differing diameter tool joints.

Also seen is anchor module 212 with legs 213 to brace against casing 202, and may also serve a centralizing function. Also seen are sensors and processors 221, 222, and 223.

Figure 3:
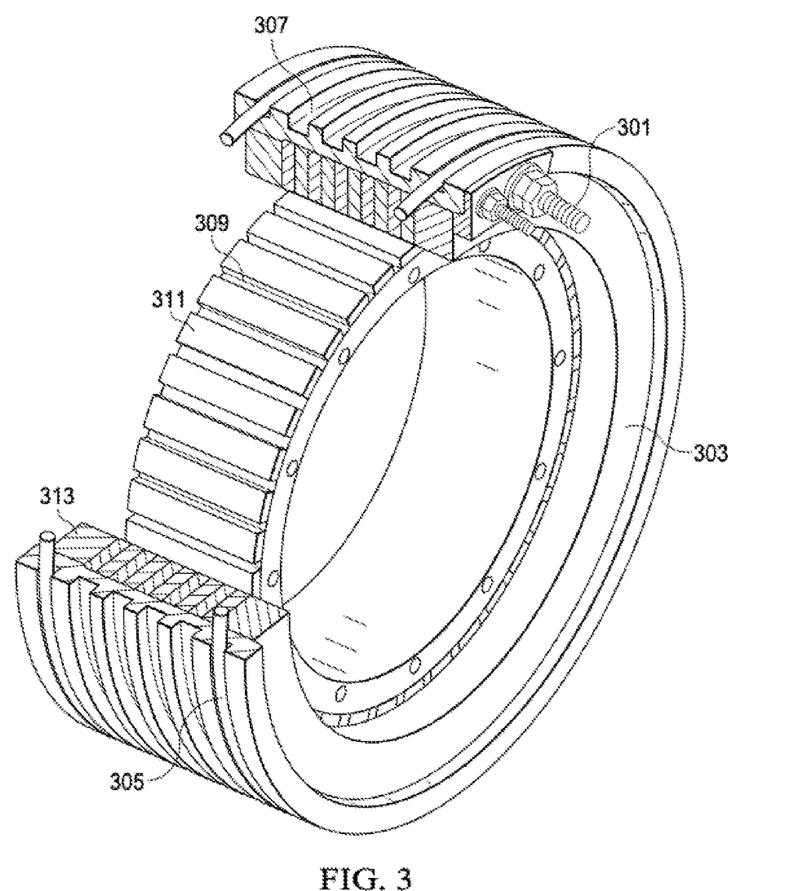
FIG. 3. Motor.

A cutaway motor is shown in FIG. 3, wherein cable output 301 is shown, along with stator 303 and O-rings 305. Windings 313 surround magnets 311 mounted on rotor rings and providing the motivating force when electricity is run therethrough. A cooling channel 307 is also shown.

In one embodiment, there may be a second motor and a second rotator, or a single motor running two rotators, allowing the grabbing of the upper and lower ends of a joint or joints to rotate same. However, this is more costly, and in most cases, one set of DJR and swivel would be suitable in nearly all situations, especially since wells that are on rod pump lift systems are generally lower producers.

The present invention is exemplified with respect to a downhole tubing rotator comprising a single motor and rotator. However, this is exemplary only, and the invention can be broadly applied to add additional motors and rotators, and add various sensors, centralizers, and the like. Alternatively, two tools may be deployed down hole as needed for more strength or to bracket a region of rotation. The examples are intended to be illustrative only, and not unduly limit the scope of the appended claims.

The following references are each incorporated by reference in their entireties for all purposes.

SPE-16198-PA (1988) MCaslin, M. K., A Study of the Methods for Preventing Rod-Wear Tubing Leaks in Sucker-Rod Pumping Wells Prod Eng 3(04): 615-618.

U.S. Pat. No. 5,327,975 Tubing anchor catcher with rotating mandrel
U.S. Pat. No. 5,427,178 Tubing rotator and hanger
U.S. Pat. No. 5,431,230 Slant wellbore tubing anchor catcher with rotating mandrel
U.S. Pat. No. 5,566,769 Tubular rotation tool for snubbing operations
U.S. Pat. No. 5,732,777 Well tubing suspension and rotator system
U.S. Pat. No. 6,026,898 Integral tubing head and rotator
U.S. Pat. No. 6,199,630 Pull-through tubing string rotator for an oil well
U.S. Pat. No. 6,543,533 Well tubing rotator
U.S. Pat. No. 6,834,717 Tubing rotator
U.S. Pat. No. 7,306,031 Tubing string rotator and method
U.S. Pat. No. 8,272,434 Tubing string hanger and tensioner assembly
U.S. Pat. No. 9,366,104 Downhole tubing rotators and related

The invention claimed is:

1. A downhole joint rotator tool, said tool comprising:
   a) a cylindrical housing with a hollow center configured to fit into a production tubing string in a well in a reservoir;
   b) either said production tubing string or said tool comprising at least one first swivel joint;
   c) said housing comprising an induction motor with a hollow center configured to rotate at least one joint above or below said tool;
   d) an armor-protected insulated power and control cable connecting said induction motor to a control box positioned at a surface of a reservoir;
   e) wherein said tool is able to rotate one or more joints above or below said tool but not an entirety of said production tubing string when said induction motor is activated via said control box.

2. The tool of claim 1, further comprising a torque sensor operatively connected to said tubing rotator.

3. The tool of claim 1, further comprising a temperature sensor and a pressure sensor operatively coupled to said cable.

4. The tool of claim 3, further comprising a vibration sensor operatively coupled to said cable.

5. The tool of claim 1, further comprising a motor temperature sensor operatively coupled to said cable.

6. The tool of claim 1, further comprising one or more centralizers on an exterior of said housing.

7. The tool of claim 1, further comprising a plurality of two pole, three phase induction squirrel cage motors each operatively connected to a tubing rotator.

8. The tool of claim 1, further comprising an anchor module to anchor the tool to a casing in said well.

9. The tool of claim 1, said motor being a two pole, three phase induction squirrel cage motor.

10. The tool of claim 1, further comprising one or more sensors operatively connected to said tool and said cable, said sensors selected from a torque sensor operatively connected to said tubing rotator, a temperature sensor and a pressure sensor operatively coupled to said cable, a motor temperature sensor operatively coupled to said cable and a vibration sensor operatively coupled to said cable.

11. A method of rotating one or more production tubing joints in a production tubing string, said method comprising:
   a) deploying a production tubing string inside a casing in a well in a reservoir, said string comprising a plurality of tubing joints and the tool of claim 1 and a second swivel joint, said tool and said first swivel joint and said second swivel joint bracketing a region of tubing to be rotated;

b) applying power to said tool such that one or more tubing joints in said region are rotated from an initial position, but not an entirety of said production tubing string; and c) producing hydrocarbon from said production tubing.

12. The method of claim 11, wherein said rotation is <10° per day, <5° per day, or about <2° per day.

13. The method of claim 11, wherein said rotation is intermittent.

14. A method of rotating one or more production tubing joints in a production tubing string, said method comprising:

a) deploying a production tubing string inside a casing in a well in a reservoir, said string comprising a plurality of tubing joints and a pair of tools of claim 1 and a pair of said first swivel joints bracketing a region of tubing to be rotated;

b) applying power to said tool such that one or more tubing joints in said region are rotated from an initial position, but not an entirety of said production tubing string; and c) producing hydrocarbon from said production tubing.

15. The method of claim 14, wherein said rotation is <10° per day, <5° per day, or about <2° per day.

* * * * *